(12) United States Patent
Chen et al.

(10) Patent No.: US 9,152,800 B2
(45) Date of Patent: Oct. 6, 2015

(54) PLUGGABLE CRYPTOGRAPHY

(75) Inventors: Geng Chen, San Jose, CA (US); Vadim Draluk, Cupertino, CA (US); Francois Goldfain, Sunnyvale, CA (US)

(73) Assignee: Dell Products L.P., Round Rock, TX (US)

( * ) Notice: Subject to any disclaimer, the term of this patent is extended or adjusted under 35 U.S.C. 154(b) by 66 days.

(21) Appl. No.: 13/463,256

(22) Filed: May 3, 2012

(65) Prior Publication Data

US 2013/0294599 A1    Nov. 7, 2013

(51) Int. Cl.
*G06F 21/60* (2013.01)

(52) U.S. Cl.
CPC .................... *G06F 21/602* (2013.01)

(58) Field of Classification Search
CPC .............. G06F 2221/2107; G06F 21/602
USPC ............................. 380/28; 726/28
See application file for complete search history.

(56) References Cited

U.S. PATENT DOCUMENTS

| | | | | |
|---|---|---|---|---|
| 7,373,504 B1 * | 5/2008 | Belgaied et al. | ............. | 713/164 |
| 8,023,644 B2 * | 9/2011 | Bolotov et al. | ............. | 380/28 |
| 8,060,751 B2 * | 11/2011 | Kitaj et al. | ............. | 713/182 |
| 8,078,885 B2 * | 12/2011 | Jobmann | ............. | 713/186 |
| 8,151,305 B2 * | 4/2012 | Doerr et al. | ............. | 725/62 |
| 8,166,294 B1 * | 4/2012 | Sangster et al. | ............. | 713/164 |
| 8,296,323 B2 * | 10/2012 | Pollard | ............. | 707/784 |
| 8,341,753 B2 * | 12/2012 | Birum et al. | ............. | 726/27 |
| 2003/0097592 A1 * | 5/2003 | Adusumilli | ............. | 713/201 |
| 2009/0147945 A1 * | 6/2009 | Doi et al. | ............. | 380/2 |
| 2012/0002803 A1 * | 1/2012 | Adi et al. | ............. | 380/28 |

OTHER PUBLICATIONS

A Device Mapper based Encryption Layer for TransCrypt; Sainath S Vellal; Indian Institute of Technology Kanpur; Jun. 2008.*
CryptoBooster: A Recongurable and Modular Cryptographic Coprocessor; Emeka Mosanya, Christof Teuscher, Hector Fabio Restrepo, Patrick Galley, and Eduardo Sanchez; CHES'99, LNCS 1717, pp. 246-256, 1999.*
FASE: An Open Run-Time Reconfigurable FPGA Architecture for Tamper-Resistant and Secure Embedded Systems; Sumanta Chaudhuri; IEEE; 2006.*
NIST Special Publication 800-131A; Transitions: Recommendation for Transitioning the Use of Cryptographic Algorithms and Key Lengths; Elaine Barker; Jan. 2011.*

* cited by examiner

*Primary Examiner* — James Turchen
(74) *Attorney, Agent, or Firm* — Kwan & Olynick LLP (57) ABSTRACT

Mechanisms are provided for allowing pluggable encryption in an operating system. Modules such as proprietary cipher modules connect to a kernel cryptographic framework using cryptographic cipher adapters. Supported cryptographic ciphers as well as proprietary cryptographic ciphers can be used in a transparent manner during file system access, key management, and metadata maintenance operations. Proprietary cipher modules interact with the cryptographic cipher adapters as though the cryptographic cipher adapters are the kernel cryptographic framework. The kernel cryptographic framework interacts with the cryptographic cipher adapters as though the cryptographic cipher adapters are proprietary cipher modules.

16 Claims, 6 Drawing Sheets

PLUGGABLE CRYPTOGRAPHY

TECHNICAL FIELD

The present disclosure relates to pluggable cryptography modules.

DESCRIPTION OF RELATED ART

Various operating systems such as Android™ provide cryptographic file systems that allow for transparent key management, disk encryption, and cryptographic metadata management. These file systems support build-in or build-included block ciphers such as Advanced Encryption Standard (AES) 128, AES 192, AES 256, Twofish, Blowfish, Data Encryption Standard (DES), Cast-5, Cast-6, etc. However, the ability of these operating systems to support proprietary or $3^{rd}$ party ciphers is limited.

Consequently, techniques and mechanisms are provided to allow efficient use of unsupported ciphers.

BRIEF DESCRIPTION OF THE DRAWINGS

The disclosure may best be understood by reference to the following description taken in conjunction with the accompanying drawings, which illustrate particular embodiments of the present invention.

DESCRIPTION OF PARTICULAR EMBODIMENTS

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques and mechanisms of the present invention will be described in the context of particular modules and ciphers. However, it should be noted that the techniques and mechanisms of the present invention apply to a variety of different modules and ciphers. In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

Mechanisms are provided for allowing pluggable encryption in an operating system. Modules such as proprietary cipher modules connect to a kernel cryptographic framework using cryptographic cipher adapters. Supported cryptographic ciphers as well as proprietary cryptographic ciphers can be used in a transparent manner during file system access, key management, and metadata maintenance operations. Proprietary cipher modules interact with the cryptographic cipher adapters as though the cryptographic cipher adapters are the kernel cryptographic framework. The kernel cryptographic framework interacts with the cryptographic cipher adapters as though the cryptographic cipher adapters are proprietary cipher modules.

Example Embodiments

Various operating systems such as Android™ include cryptographic file systems that support transparent key management, disk encryption, and cryptographic metadata management. These file systems support build-in block ciphers such as Advanced Encryption Standard (AES) 128, AES 192, AES 256, Twofish, Blowfish, Data Encryption Standard (DES), Cast-5, Cast-6, etc., and are specifically designed for security. In some example, file system-level encryption provides a variety of benefits over file-level or volume-level encryption. According to various embodiments, individual files or directories are encrypted by the file system itself. Each file can be encrypted with a separate encryption key. Incremental backups of individual, changed files can be performed even while the files are in encrypted form. Access control can be enforced through the use of public-key cryptography.

Operating systems include a kernel cryptographic framework in kernel space as well as user modules in user space. The kernel cryptographic framework may be an interface or virtualization layer that provides a standardized mechanism for accessing various cryptography modules. According to various embodiments, the kernel cryptographic framework has access to supported, build-included cryptographic ciphers. However, many conventional operating systems do not support $3^{rd}$ party or proprietary ciphers. In many instances, new versions or new builds of an operating system are required to include new ciphers. In other instances, a government or corporate entity may wish to use its own proprietary cipher, and this proprietary cipher may never be included in any operating system build.

Consequently, the techniques and mechanisms of the present invention provide a cryptographic cipher adapter that provides a cryptographic framework with the ability to access $3^{rd}$ party or proprietary cryptographic ciphers without requiring a new operating system build. Unsupported cryptographic ciphers can be added at any point. No new versions or builds are required. Government or corporate entities can verify operation of a cryptographic cipher module and include that cipher module in a cryptographic file system.

According to various embodiments, to include a cryptographic cipher adapter, the kernel cryptographic framework as well as kernel build-included cryptographic ciphers need not be changed. In particular embodiments, only a few user space modules and kernel space modules need to be modified. According to various embodiments, initialization or load modules are modified to include $3^{rd}$ party or proprietary cryptographic cipher modules during operating system startup. Identification, location, and cipher change modules are updated to include $3^{rd}$ party or proprietary cryptographic cipher modules. A cryptographic cipher adapter is included to allow use of $3^{rd}$ party proprietary ciphers that are not supported or compatible with a kernel cryptographic framework.

Figure 1:
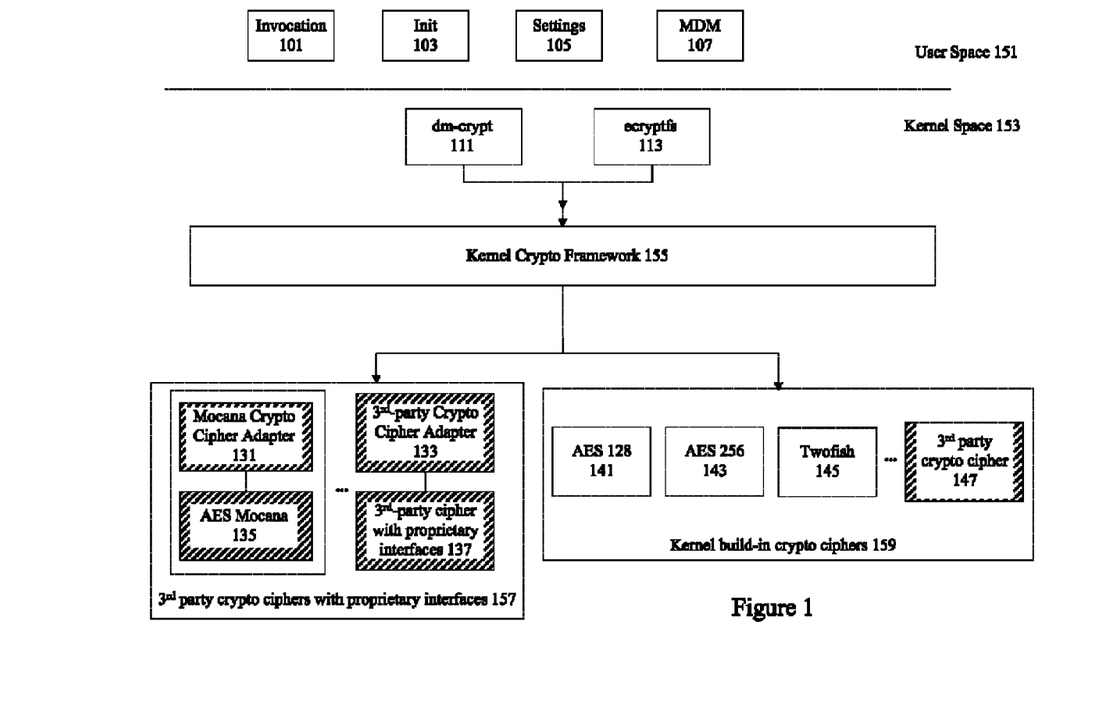
FIG. 1 illustrates a particular example of a cryptographic system.

FIG. 1 illustrates one example of a cryptographic cipher system. The system includes a user space 151 and a kernel space 153 associated with an operating system. According to various embodiments, user space 151 includes applications and non-core operating system functions. Kernel space 153 includes core operating system functions that provide the lowest-level abstraction layer for resources such as processor, memory, and peripherals. According to various embodiments, kernel space 153 includes a kernel cryptographic framework 155. The kernel cryptographic framework 155 provides a standard interface for user space 151 applications to access cryptographic ciphers 159.

According to various embodiments, user space 151 may include modules such as an encryption invocation module 101 such as volume daemon (void) in Android. The invocation module 101 allows cryptographic operations to be called from user space 151 applications. According to various embodiments, user space 151 may also include an initialization module 103 that loads $3^{rd}$ party and/or proprietary cipher modules during power up of a device. A settings module 105 may be included to allow a user to select whether to apply encryption to particular files, to particular modes (such as only when a device is in work or enterprise mode), or use specific cipher types, etc. A mobile device management (MDM) agent 107 allows an administrator to set cipher type based on a cipher policy.

According to various embodiments, invocation module 101, initialization module 103, settings module 105, and MDM agent module 107 interact with a kernel cryptographic framework 155 through a device mapper cryptographic target (dm-crypt) module 111 and an encrypted file system (ecryptfs) module 113.

In particular embodiments, dm-crypt module 111 is a block device encryption module that provides a generic way to virtualize block devices (such as disks) so that operations such as striping, concatenation, mirroring, and snapshotting can be performed efficiently on these block devices. The dm-crypt module 111 performs these disk operations using particular ciphers, keys, and other cryptographic information such as initialization vectors to create new data blocks. Writes using these striping, concatenation, mirroring, and snapshotting mechanisms can be encrypted while reads are decrypted. The dm-crypt module 111 may be configured to use supported ciphers as well as $3^{rd}$ party and propriety ciphers through a cipher adapter while performing disk operations.

According to various embodiments, the ecryptfs module 113 is a file system encryption module that user space 151 can utilize to access cryptographic framework 155. The ecryptfs module 113 is an enterprise class file system that transforms plaintext to ciphertext and vice-versa. According to various embodiments, the ecryptfs module 113 protects work and enterprise data when a user switches to a work or enterprise mode. Unlike block device encryption modules like dm-crypt 111, the ecryptfs module 113 does not simply transform blocks as they pass between plain-text and cipher text, ecryptfs operates on existing, mounted file systems and applies encryption on a per-file basis. The ecryptfs module 113 may selectively encrypt only particular files but can only protect applications that write their data into regular files.

The dm-crypt module 111 and the ecryptfs module 113 are configured to access customized modules through adapters such as Mocana cryptographic cipher adapter 131 and 3rd party cryptographic cipher adapter 133 in $3^{rd}$-party cryptographic ciphers with proprietary interfaces module 157. The Mocana cryptographic cipher adapter 131 has access to AES Mocana 135 while $3^{rd}$ party cryptographic cipher adapter 133 has access to $3^{rd}$ party cipher with proprietary interfaces module 137. According to various embodiments, the cryptographic ciphers may be maintained in module 157. In other examples, interfaces to cipher modules are maintained in module 157. According to various embodiments, cryptographic adapters 131 and 133 along with cipher 135 and cipher interfaces 137 are pre-loaded in kernel space. In particular embodiments, where there is a $3^{rd}$-party cipher with proprietary interfaces 137 in module 157, the $3^{rd}$ party cryptographic cipher 147 is also pre-loaded. The $3^{rd}$-party cryptographic cipher is included in a kernel build-included cryptographic cipher module 159 that maintains build-in ciphers, i.e. ciphers included in the kernel build, such as AES 128 141, AES 256 143, and Twofish 145.

According to various embodiments, the kernel cryptographic framework 155 need not be modified. However, dm-crypt 111 and ecryptfs 113 may be modified to support pluggable 3rd party or proprietary cipher modules. The type of cryptographic cipher used can be selected from a security setting application 105 or selected by an MDM agent module 107 according to a policy set by an MDM server.

The $3^{rd}$ party cryptographic ciphers can be applied at both the file system level using ecryptfs module 113 for enterprise-specific data or other specified data, and at the disk level for entire data and sdcard partition-based encryption by using the dm-crypt module 111. The pluggable 3rd party proprietary crypto cipher and adapters can be included in a kernel build or may be pre-loaded in a dynamic and flexible manner.

According to various embodiments, a $3^{rd}$ party cryptographic cipher is loaded by an operating system initialization process during boot. Once the $3^{rd}$ party cryptographic cipher is loaded, it registers itself in the kernel cryptographic framework either through the framework's standard registration interface or by way of a customized adapter such as adapter 131 or 133 that is compatible with the framework.

To enable encryption for particular data such as work data or to enable encryption for an entire device, a settings application 105 or an MDM agent 107 may be used. The cipher-type for encryption can be set to default or can be changed by sending a cipher-type policy to an MDM agent 107. According to various embodiments, dm-crypt 111 and ecryptfs 113 both use the same cipher. The $3^{rd}$ party or proprietary cryptographic cipher can be located by dm-crypt 111 or ecryptfs 113 through the kernel cryptographic framework's standard cipher probing interface. A customized cipher adapter such as adapter 131 or 133 is used to interface with the framework 155 to locate the cipher if the $3^{rd}$ party cipher is not compatible with the framework. In particular embodiments, dm-crypt 111 and ecryptfs 113 transform ciphertext through the kernel cryptographic framework's cipher transforming interface. A customized cryptographic cipher adapter such as adapter 131 or 133 is used to interact with the cryptographic framework to encrypt and decrypt the data if the 3$^{rd}$ party cipher is not compatible with the framework.

Figure 2:
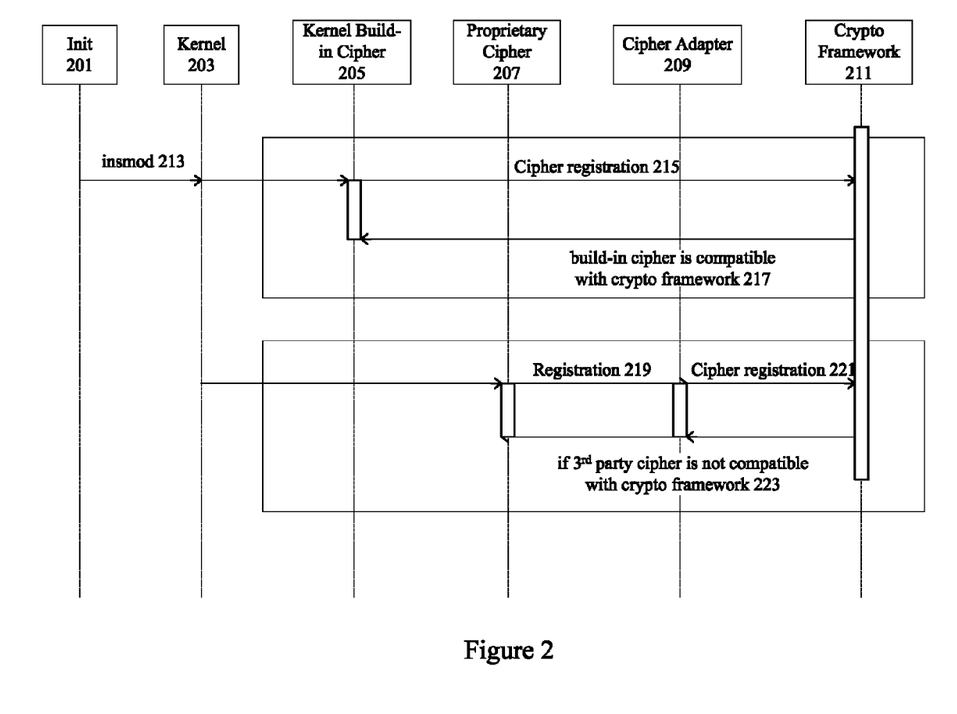
FIG. 2 illustrates a particular example of cryptographic cipher loading.

FIG. 2 illustrates one particular example of cryptographic cipher loading. According to various embodiments, a 3$^{rd}$ party cryptographic cipher is loaded during boot of an operating system. An initialization module 201 sends an insert module (insmod) 213 request to a kernel 203. The module to be inserted may be a 3$^{rd}$ party or proprietary cryptographic cipher module. If the cipher is compatible with the cryptographic framework, the kernel build-in cipher module 205 sends a cipher registration message 215 to the cryptographic framework 211. The cryptographic framework 211 responds to the kernel build-in cipher module 205 with an acknowledgement.

However, if the cipher is not compatible with the cryptographic framework, a proprietary cipher 207 sends a registration message to 219 to a cipher adapter 209. The cipher adapter 209 sends a cipher registration 221 to the cryptographic framework 211. The cryptographic framework 211 responds with an acknowledgment to the cipher adapter 209 which then maps the message back to proprietary cipher 207.

Figure 3:
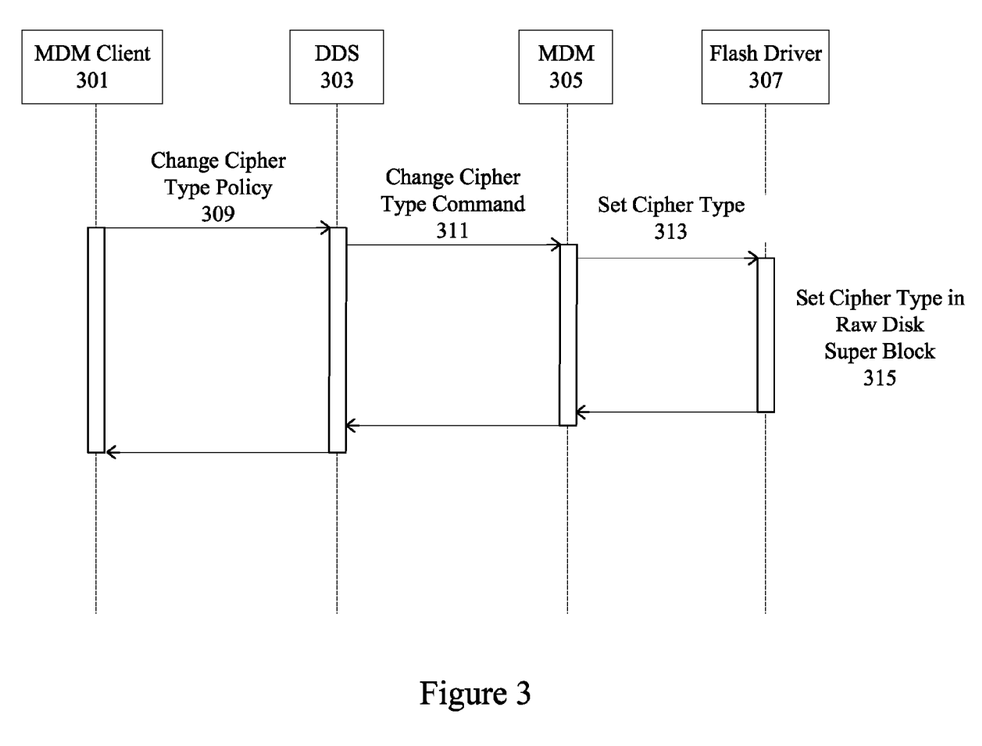
FIG. 3 illustrates a particular example of cryptographic cipher change.

FIG. 3 illustrates one example of cryptographic cipher type change. According to various embodiments, a mobile device management (MDM) client 301 sends a change cipher type policy request message 309 to data distribution service (DDS) 303. DDS 303 is one example of a service that can be used as standard communications middleware. Although a DDS component 303 is shown, it should be noted that in some examples, no DDS component is needed. The DDS component 303 sends a change cipher type command 311 to MDM 305. The MDM 305 sends a set cipher type message 313 to a flash driver 307. The flash driver 307 sets the cipher type in a raw disk super block at 315.

Figure 4A:
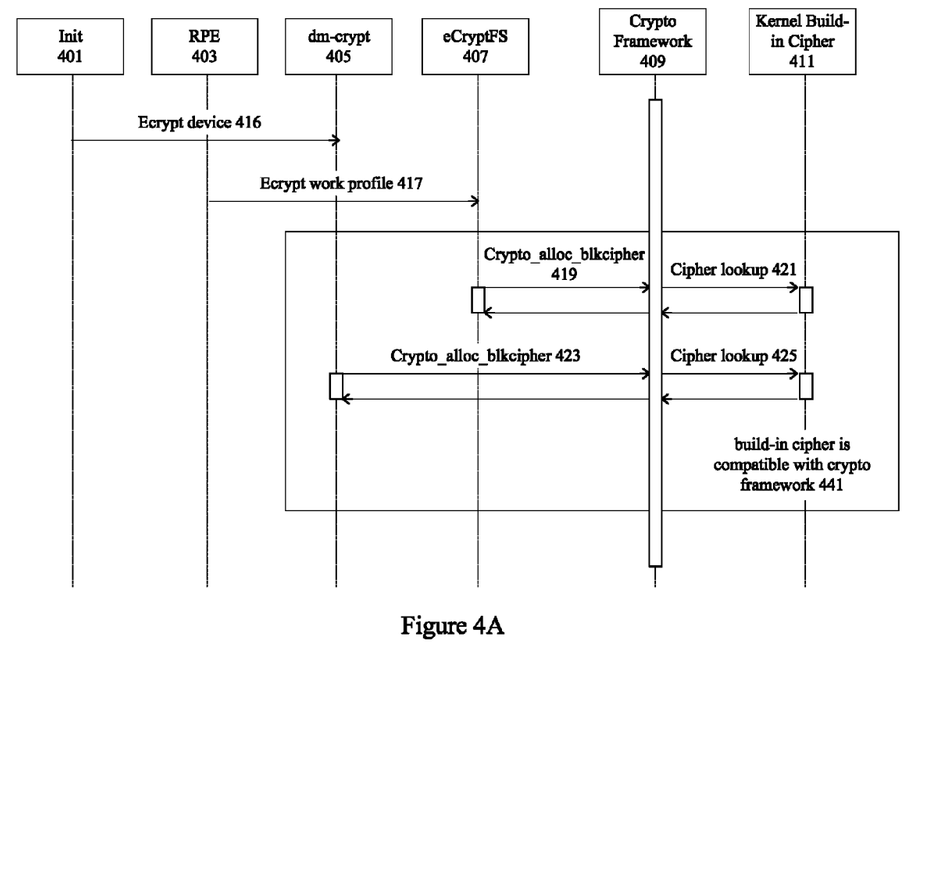
FIGS. 4A and 4B illustrate a particular example of cryptographic cipher identification and lookup.
Figure 4B:
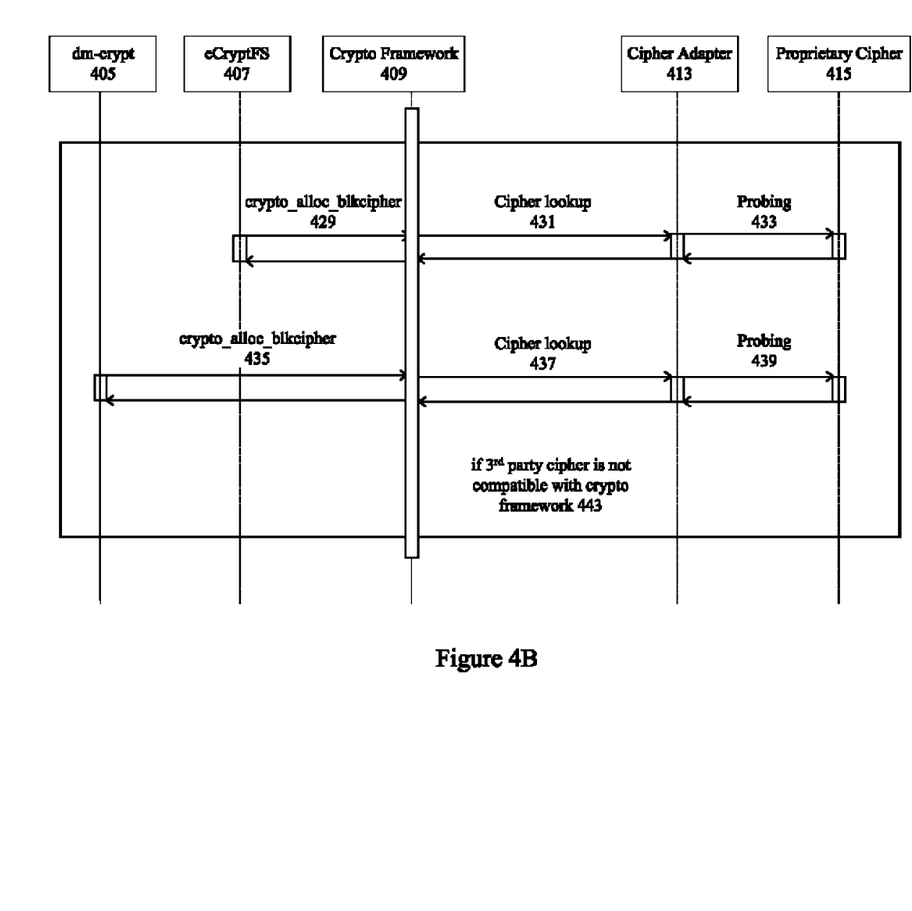

FIGS. 4A and 4B illustrate particular examples of accessing a cryptographic cipher. An initialization module 401 sends an encrypt device module 416 to dm-crypt module 405. The dm-crypt module 405 can perform block-based encryption. In particular embodiments, the dm-crypt module 405 allows init module 401 to access a wide variety of disks and storage devices in a generic manner through a standardized dm-crypt virtualization layer. It should be noted that dm-crypt is one particular term for a block device encryption module. A variety of block device encryption modules can be used. In particular embodiments, the dm-crypt module 405 allows disk operations such as striping, concatenation, mirroring, and snapshotting while blocks being written are encrypted and blocks being read are decrypted. The dm-crypt module 405 performs these disk operations using particular ciphers, keys, and other cryptographic information such as initialization vectors to create new data blocks.

The dm-crypt module 405 sends a cryptographic allocation block cipher message 423 to a cryptographic framework 409. The cryptographic framework 409 performs a cipher lookup 425. If the cipher is compatible with the cryptographic framework at 441, the kernel build-in cipher 411 returns an acknowledgement.

Similarly, if a device resource partition engine (RPE) 403 wishes to encrypt certain files or folders based on a work or enterprise profile, for example, the RPE 403 sends an encrypt work profile message 417 to the ecryptfs module 407.

According to various embodiments, the ecryptfs module 407 is a file system encryption module that can be used to access a cryptographic framework. It should be noted that ecryptfs is one particular term for the file system encryption module and a variety of file system encryption modules can be used. According to various embodiments, the ecryptfs module 407 protects work and enterprise data when a user switches to a work or enterprise mode. Unlike block device encryption modules like dm-crypt 405, the ecryptfs module 407 does not simply transform blocks as they pass between plain-text and cipher text, ecryptfs operates on existing, mounted file systems and applies encryption on a per-file basis. The ecryptfs module 407 may selectively encrypt only particular files but can only protect applications that write their data into regular files.

The ecryptfs module 407 sends a cryptographic allocation block cipher request 419 to a cryptographic framework 409. The cryptographic framework 409 sends a cipher lookup message 421. If the cipher is compatible with the cryptographic framework at 411, the kernel build-in cipher 411 returns an acknowledgement.

FIG. 4B shows operations when a cipher is not compatible with a cryptographic framework at 443. To perform block-level encryption, dm-crypt 405 is used. According to various embodiments, the dm-crypt module 405 sends a cryptographic allocation block cipher message 435 to a cryptographic framework 409. The cryptographic framework 409 performs a cipher lookup 437. However, the cipher lookup 437 is not sent directly to the proprietary cipher 415 but is instead sent to a cipher adapter 413. The cipher adapter 413 proceeds to send a probe 439 to the proprietary cipher 415. According to various embodiments, the cryptographic framework 409 interacts with the cipher adapter 413 as though the cipher adapter 413 is a kernel build-in cipher. The proprietary cipher 415 returns an acknowledgment to the cipher adapter 413. According to various embodiments, the cipher adapter 413 interacts with the proprietary cipher 415 as though the cipher adapter 413 is a cryptographic framework 409.

To perform file-level encryption, ecryptfs 407 is used. According to various embodiments, the ecryptfs module 407 sends a cryptographic allocation block cipher request 429 to a cryptographic framework 409. Instead of sending a cipher lookup message 431 to a proprietary cipher 415, the cryptographic framework 409 sends a cipher lookup message 431 to a cipher adapter. The cipher adapter 413 proceeds to send a probe 433 to proprietary cipher 415. According to various embodiments, the cryptographic framework 409 interacts with the cipher adapter 413 as though the cipher adapter 413 is a kernel build-in cipher. The proprietary cipher 415 returns an acknowledgment to the cipher adapter 413. According to various embodiments, the cipher adapter 413 interacts with the proprietary cipher 415 as though the cipher adapter 413 is a cryptographic framework 409.

Figure 5:
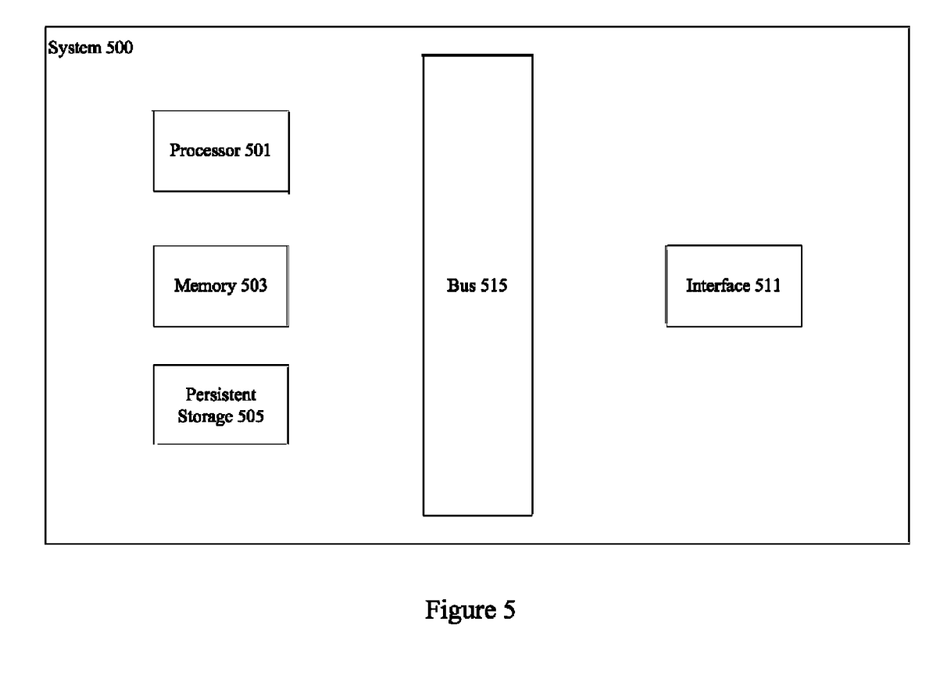
FIG. 5 illustrates a particular example of a computer system.

A variety of devices and applications can implement particular examples of the present invention. FIG. 5 illustrates one example of a system that can be used to provide pluggable encryption. According to particular example embodiments, a system 700 suitable for implementing particular embodiments of the present invention includes a processor 501, a memory 503, an interface 511, persistent storage 505, and a bus 515 (e.g., a PCI bus). When acting under the control of appropriate software or firmware, the processor 501 is responsible for such tasks such as optimization. Various specially configured devices can also be used in place of a processor 501 or in addition to processor 501. The complete implementation can also be done in custom hardware. The interface 511 is typically configured to send and receive data packets or data segments over a network. Particular examples of interfaces the device supports include Ethernet interfaces, frame relay interfaces, cable interfaces, DSL interfaces, token ring interfaces, and the like. Persistent storage 505 may include disks, disk arrays, tape devices, solid state storage, etc.

In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to particular example embodiments, the system 500 uses memory 503 to store data and program instructions and maintain a local side cache. The program instructions may control the operation of an operating system and/or one or more applications, for example. The memory or memories may also be configured to store received metadata and batch requested metadata.

Because such information and program instructions may be employed to implement the systems/methods described herein, the present invention relates to tangible, machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

Although many of the components and processes are described above in the singular for convenience, it will be appreciated by one of skill in the art that multiple components and repeated processes can also be used to practice the techniques of the present invention.

While the invention has been particularly shown and described with reference to specific embodiments thereof, it will be understood by those skilled in the art that changes in the form and details of the disclosed embodiments may be made without departing from the spirit or scope of the invention. It is therefore intended that the invention be interpreted to include all variations and equivalents that fall within the true spirit and scope of the present invention.

What is claimed is:

1. A method comprising:
   determining at a cryptographic framework that a kernel does not support a first cryptographic cipher, the cryptographic framework residing in kernel space, wherein the first cryptographic cipher is incompatible with the cryptographic framework;
   sending a cipher lookup from the cryptographic framework to a cryptographic cipher adapter, the cryptographic cipher adapter configured to connect to the first cryptographic cipher by allowing use of third party proprietary ciphers that are not compatible with the cryptographic framework;
   performing cryptographic cipher algorithm initialization and setup via the cipher adapter such that the cryptographic framework interacts with the cipher adapter as though the cipher adapter is a kernel build-in cipher;
   performing a cryptographic data transformation using the first cryptographic cipher via the cipher adapter such that the first cipher interacts with the cipher adapter as though the cipher adapter is the cryptographic framework, wherein a request to perform the cryptographic data transformation results from a user space request.

2. The method of claim 1, wherein the first cryptographic cipher is a proprietary cryptographic cipher.

3. The method of claim 1, wherein a plurality of cryptographic ciphers including Twofish and Advanced Encryption Standard (AES) 128-bit and 256-bit are supported by the kernel.

4. The method of claim 1, wherein an invocation module and an initialization module reside in user space.

5. The method of claim 4, wherein the cryptographic framework is configured to connect to a plurality of supported cryptographic ciphers and a plurality of cryptographic cipher adapters.

6. The method of claim 1, wherein the request is transmitted from a cryptographic file system module.

7. The method of claim 6, wherein the cryptographic file system module is an electronic cryptographic file system (ecryptfs) module.

8. The method of claim 1, wherein the request is transmitted from a block encryption module.

9. The method of claim 8, wherein the block encryption module is a device mapper cryptographic target (dm-crypt).

10. A system comprising:
    a cryptographic framework configured to determine that a kernel does not support a first cryptographic cipher, the cryptographic framework residing in kernel space, wherein the first cryptographic cipher is incompatible with the cryptographic framework;
    a cryptographic cipher adapter configured to receive a cipher lookup from the cryptographic framework and connect to the first cryptographic cipher by allowing use of third party proprietary ciphers that are not compatible with the cryptographic framework;
    a hardware processor configured to perform cryptographic cipher algorithm initialization and setup and a cryptographic data transformation using the first cryptographic cipher via the cipher adapter such that the cryptographic framework interacts with the cipher adapter as though the cipher adapter is a kernel build-in cipher and the first cipher interacts with the cipher adapter as though the cipher adapter is the cryptographic framework, wherein a request to perform the cryptographic data transformation results from a user space request.

11. The system of claim 10, wherein the first cryptographic cipher is a proprietary cryptographic cipher.

12. The system of claim 10, wherein a plurality of cryptographic ciphers including Twofish and Advanced Encryption Standard (AES) 128-bit and 256-bit are supported by the kernel.

13. The system of claim 10, wherein an invocation module and an initialization module reside in user space.

14. The system of claim 13, wherein the cryptographic framework is configured to connect to a plurality of supported cryptographic ciphers and a plurality of cryptographic cipher adapters.

15. The system of claim 10, wherein the request is transmitted from a cryptographic file system module.

16. A non-transitory computer readable medium comprising:
    computer code for determining at a cryptographic framework that a kernel does not support a first cryptographic cipher, the cryptographic framework residing in kernel space, wherein the first cryptographic cipher is incompatible with the cryptographic framework;

computer code for sending a cipher lookup from the cryptographic framework to a cryptographic cipher adapter, the cryptographic cipher adapter configured to connect to the first cryptographic cipher by allowing use of third party proprietary ciphers that are not compatible with the cryptographic framework;

computer code for performing cryptographic cipher algorithm initialization and setup via the cipher adapter such that the cryptographic framework interacts with the cipher adapter as though the cipher adapter is a kernel build-in cipher; computer code for performing a cryptographic data transformation using the first cryptographic cipher via the cipher adapter such that the first cipher interacts with the cipher adapter as though the cipher adapter is the cryptographic framework, wherein a request to perform the cryptographic data transformation results from a user space request.

\* \* \* \* \*